(12) United States Patent  (10) Patent No.: US 9,255,829 B2
Leone et al.  (45) Date of Patent: Feb. 9, 2016

(54) SYSTEMS AND METHODS FOR DETERMINING AMOUNT OF LIQUID AND GASEOUS FUEL

(71) Applicant: Ford Global Technologies, LLC, Dearborn, MI (US)

(72) Inventors: Thomas G. Leone, Ypsilanti, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 14/151,683

(22) Filed: Jan. 9, 2014

(65) Prior Publication Data

US 2015/0192450 A1    Jul. 9, 2015

(51) Int. Cl.
```
G06F 7/00      (2006.01)
G01F 23/14     (2006.01)
G01F 23/00     (2006.01)
F02D 29/02     (2006.01)
```

(52) U.S. Cl.
CPC ................ *G01F 23/14* (2013.01); *F02D 29/02* (2013.01); *G01F 23/00* (2013.01); *F02D 2700/07* (2013.01)

(58) Field of Classification Search
None
See application file for complete search history.

(56) References Cited

U.S. PATENT DOCUMENTS

| | | | |
|---|---|---|---|
| 5,117,802 A | 6/1992 | Durbin | |
| 5,816,224 A | 10/1998 | Welsh et al. | |
| 6,543,423 B2 | 4/2003 | Dobryden et al. | |
| 6,584,780 B2 | 7/2003 | Hibino et al. | |
| 8,342,158 B2 | 1/2013 | Ulrey et al. | |
| 2011/0061622 A1 | 3/2011 | Lund | |
| 2013/0000607 A1 | 1/2013 | Watanabe | |
| 2013/0013183 A1 | 1/2013 | Surnilla et al. | |
| 2013/0160741 A1 | 6/2013 | Sommars et al. | |

OTHER PUBLICATIONS

Leone, Thomas G. et al., "Systems and Methods for Separation of Liquid and Gaseous Fuel for Injection," U.S. Appl. No. 14/152,869, filed Jan. 10, 2014, 37 pages.
Leone, Thomas G. et al., "Refueling Systems and Methods for Mixed Liquid and Gaseous Fuel," U.S. Appl. No. 14/051,312, filed Oct. 10, 2013, 36 pages.
Leone, Thomas G. et al., "Refueling Systems and Methods for Mixed Liquid and Gaseous Fuel," U.S. Appl. No. 14/051,333, filed Oct. 10, 2013, 36 pages.
Lannug, Axel et al., "The Solubility of Methane in Hydrocarbons, Alcohols, Water and Other Solvents," ACTA Chemica Scandinavica 14, pp. 1124-1128, Copenhagen, Denmark, 1960, 5 pages.
Sebastian, Herbert M. et al., "Correlation of the Solubility of Methane in Hydrocarbon Solvents," Ind. Eng. Chem. Fundam., 1981, vol. 20, No. 4, pp. 346-349, American Chemical Society, 4 pages.

*Primary Examiner* — Bhavesh V Amin
(74) *Attorney, Agent, or Firm* — Julia Voutyras; Alleman Hall McCoy Russell & Tuttle LLP

(57) ABSTRACT

A method may comprise, on board a vehicle and executed by a vehicle controller, determining a liquid volume based on a fuel level sensor, determining a gas volume based on the liquid volume, the liquid volume comprising first and second fuels, the gas volume comprising the second fuel, determining a second fuel solubility in the first fuel based on a fuel temperature sensor, determining first and second fuel quantities based on the second fuel solubility, and adjusting engine operation based on the first and second fuel quantities.

20 Claims, 4 Drawing Sheets

SYSTEMS AND METHODS FOR DETERMINING AMOUNT OF LIQUID AND GASEOUS FUEL

BACKGROUND AND SUMMARY

Compressed natural gas (CNG) is a high octane fuel that is beneficial for reducing engine knock, for reducing hydrocarbon emissions in cold start events, and for reducing carbon dioxide emissions during engine operations. However, CNG has a low energy density compared to liquid hydrocarbon fuels, such as diesel fuel or gasoline. To increase the range and total fuel quantity stored in a vehicle, CNG may be utilized in conjunction with gasoline or diesel fuel, requiring the vehicle to switch between fuels for optimal performance. However, inclusion of separate fuel tanks may not be suitable in a vehicle due to space constraints. A preferable system may be one that stores liquid fuel and pressurized gaseous fuel together in single fuel tank. In particular, CNG is substantially soluble in gasoline or diesel fuel when stored together at a relatively low pressure (~100 psi).

The inventors herein have recognized potential issues with the above approach. Namely, when a first fuel and a second fuel are stored together in the same fuel tank, each of the fuels may be partially soluble in the other fuel, and it is complicated to separately quantify the amount of each fuel remaining in the fuel tank. For example, the measured liquid fuel volume may comprise a first fuel and a portion of the second fuel solubilized in the first fuel. Furthermore the temperature, pressure and fuel composition in the fuel tank may change during engine operation and as portions of the first fuel and the second fuel are consumed. Accordingly, the amount of the second fuel solubilized in the first fuel may change during engine operation.

One approach which at least partially addresses the above issues includes a method, comprising on board a vehicle, measuring a volume of a liquid fuel in a fuel tank, wherein the liquid fuel comprises a first fuel and a second fuel, based on the volume of the liquid fuel, calculating a volume of a gaseous fuel in the fuel tank, wherein the gaseous fuel comprises essentially the second fuel, determining a solubility of the second fuel in the first fuel, and based on the solubility of the second fuel in the first fuel, determining a quantity of the first fuel in the fuel tank and a quantity of the second fuel in the fuel tank.

In another embodiment, a method of operating an engine may comprise, during a first condition, determining a solubility of the second fuel in the first fuel, determining a quantity of a first fuel and a quantity of a second fuel in the fuel tank based on the solubility of the second fuel in the first fuel, and adjusting a first fuel indicator and a second fuel indicator based on the quantity of the first fuel and the quantity of the second fuel in the fuel tank.

In another embodiment, a fuel system may comprise, a fuel tank on board a vehicle, the fuel tank comprising a liquid fuel and a gaseous fuel stored therein, a liquid fuel level sensor and a pressure sensor positioned at the fuel tank, and a controller, with executable instructions to, during a first condition, measure a volume of the liquid fuel in the fuel tank with the liquid fuel level sensor, wherein the liquid fuel comprises a first fuel and a second fuel, measure a pressure of the fuel tank with the pressure sensor, based on the volume of the liquid fuel, calculate a volume of the gaseous fuel in the fuel tank, wherein the gaseous fuel comprises essentially the second fuel, determine a solubility of the second fuel in the first fuel based on the pressure and temperature, and based on the solubility of the second fuel in the first fuel, determining a quantity of the first fuel and a quantity of the second fuel in the fuel tank.

In this way, a technical result may be achieved in that a quantity of the first fuel and a quantity of the second fuel may be accurately determined to provide an accurate indication of fuel remaining in the fuel tank to a vehicle operator. Furthermore, engine operation may be adjusted based on the quantity of the first fuel and the quantity of the second fuel to reduce engine emissions, reduce engine knock, and increase fuel economy. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically depicts an example cylinder of an internal combustion engine.

DETAILED DESCRIPTION

Figure 1:
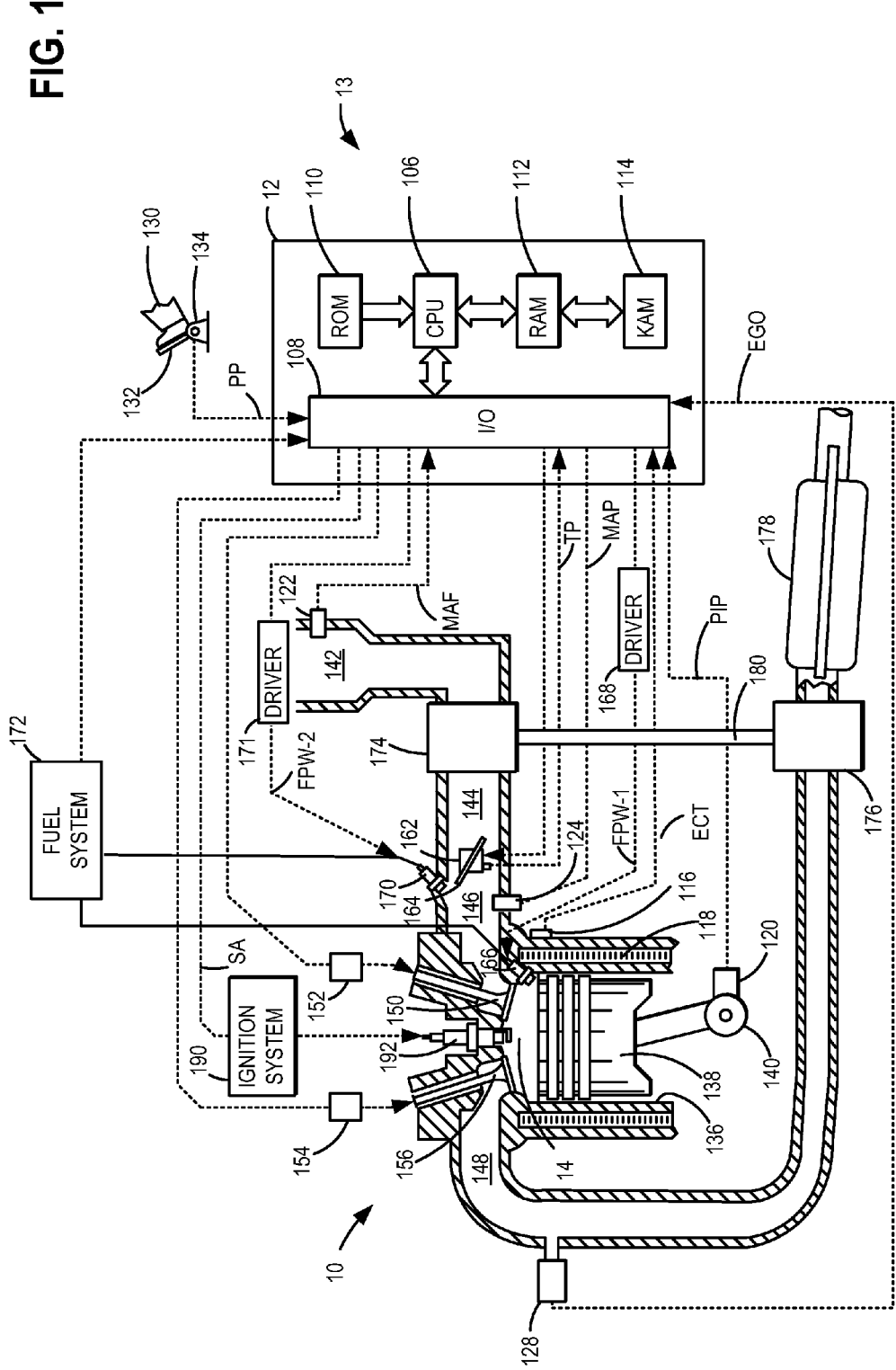
Figure 2:
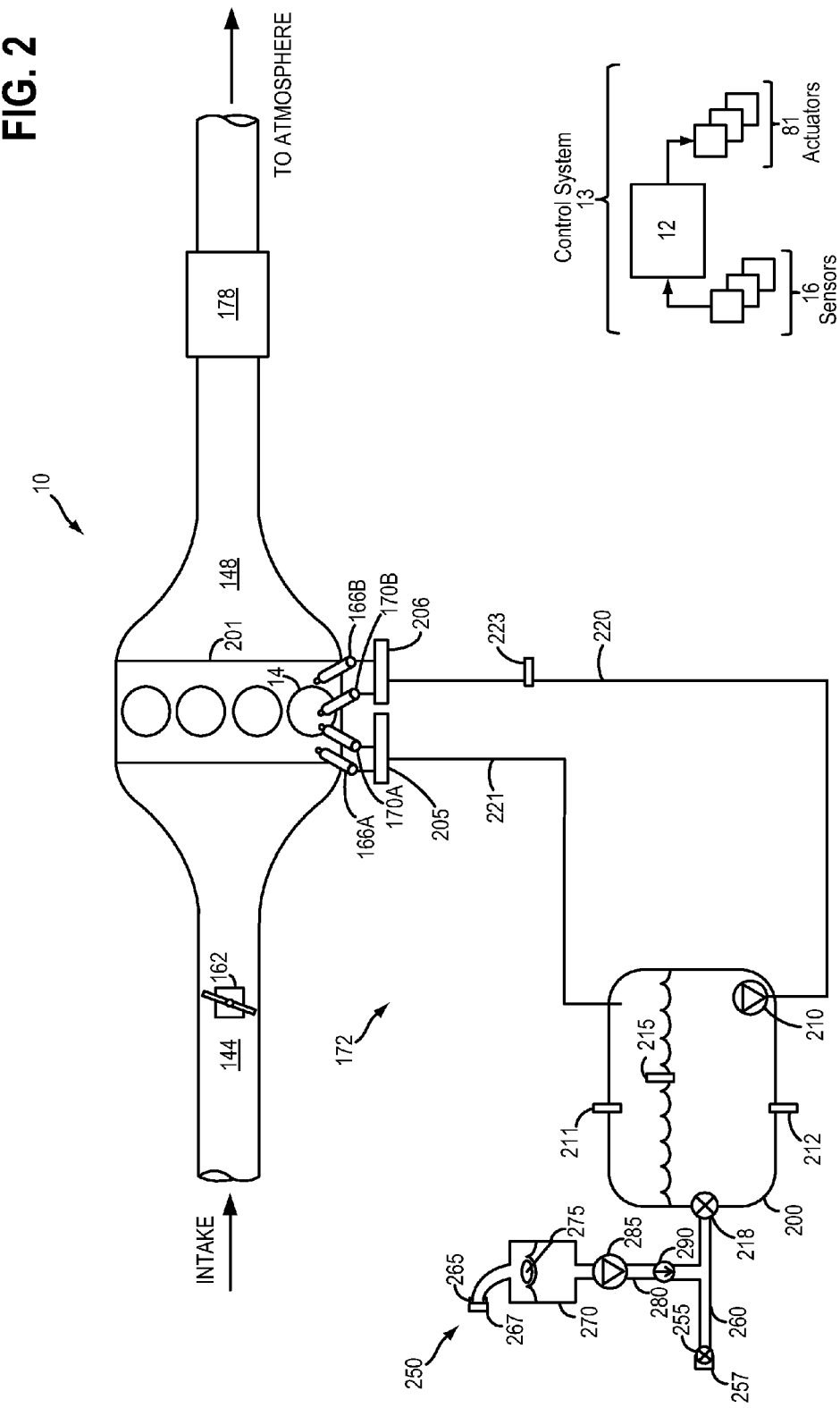
FIG. 2 shows a schematic depiction of the engine of FIG. 1 and a fuel system configured to operate on a mix of gaseous fuel and liquid fuel.
Figure 3:
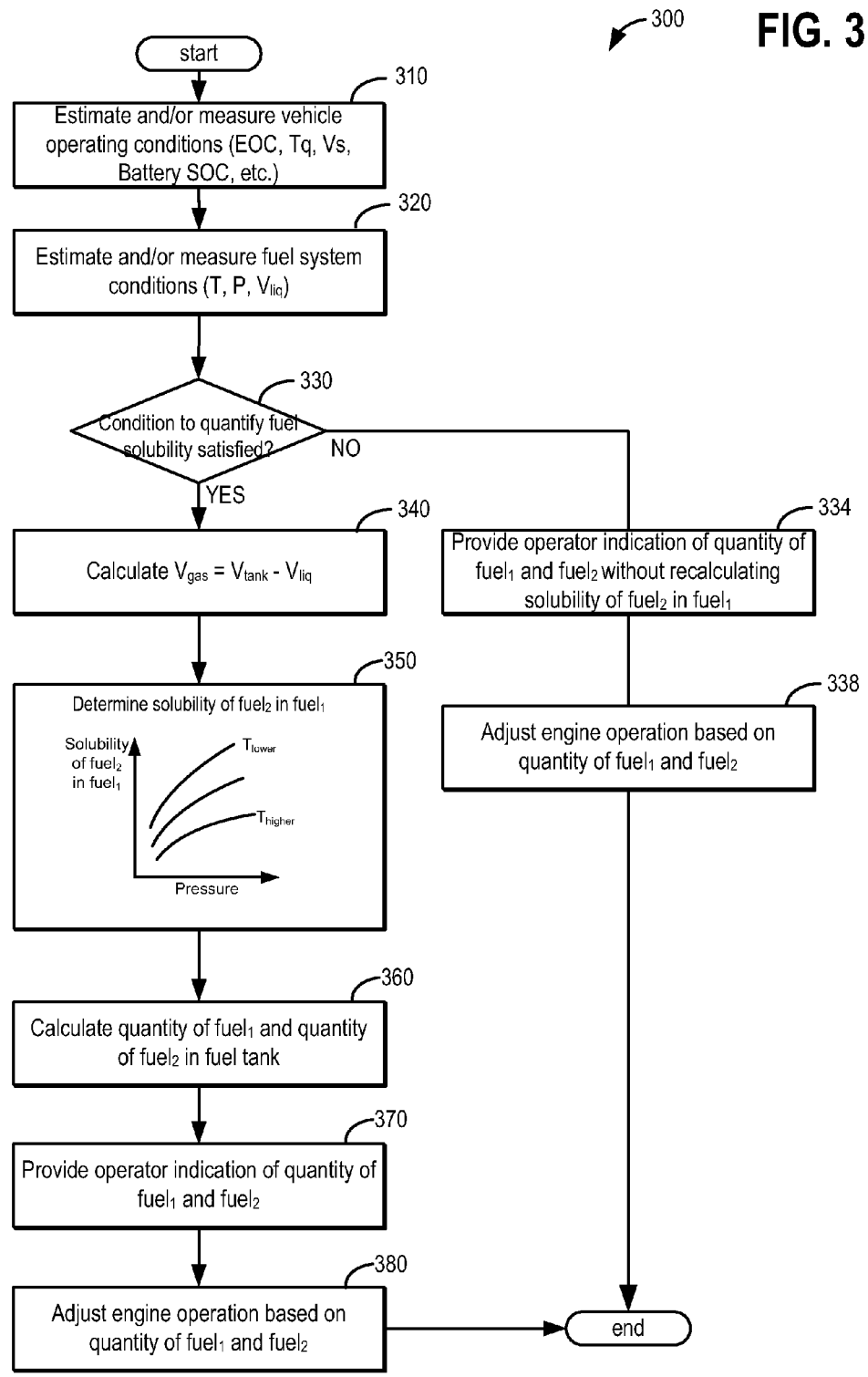
FIG. 3 shows a flow chart of an example method for operating the engine and fuel system of FIGS. 1-2.
Figure 4:
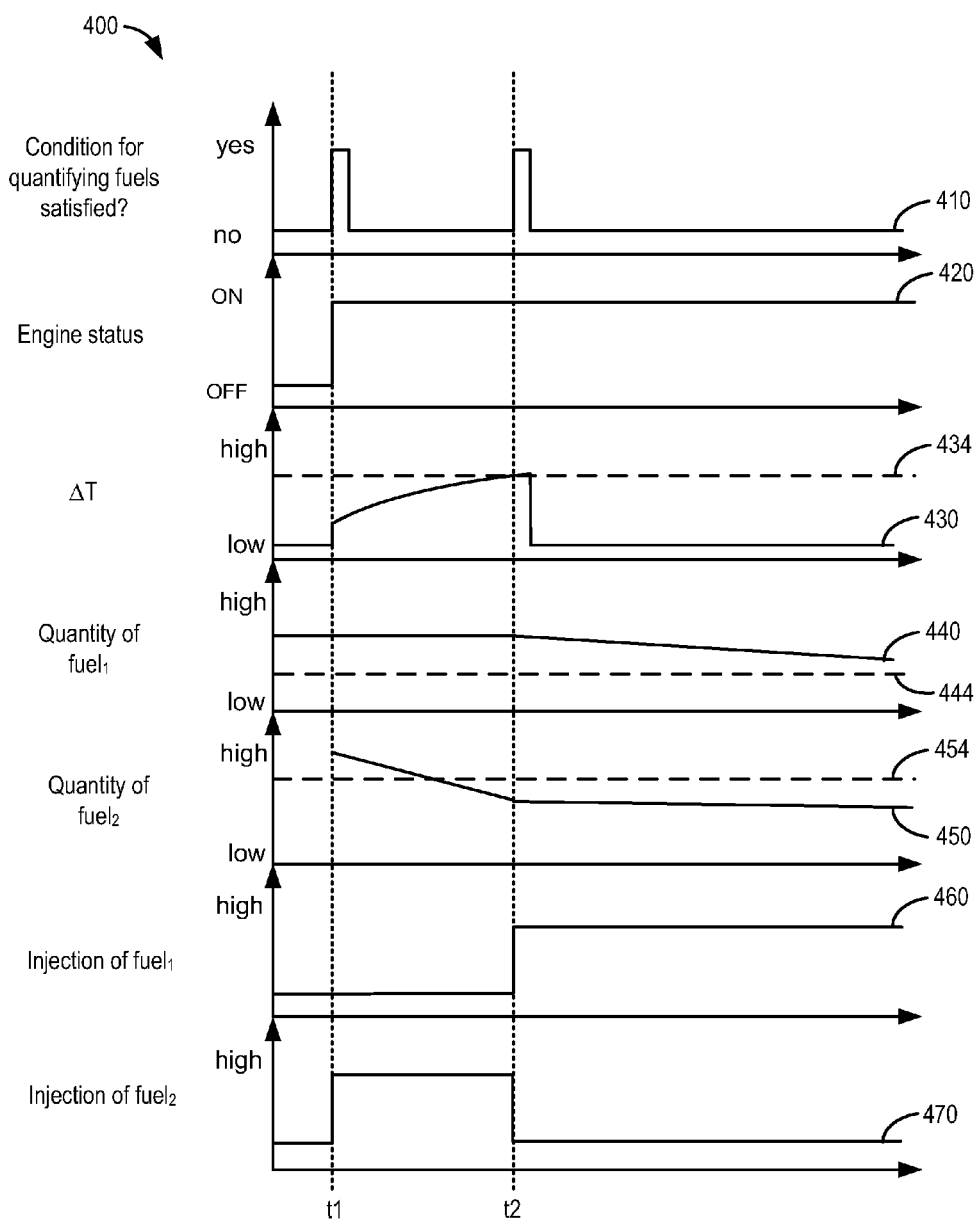
FIG. 4 shows an example timeline for operating the engine and fuel system of FIGS. 1-2.

The present description relates to systems and methods for determining a quantity of fuel in a fuel system for an engine on board a vehicle. The fuel may comprise a mixed fuel, which may comprise both liquid fuels and gaseous fuels stored in the same fuel tank. An example internal combustion engine and fuel system is illustrated in FIGS. 1 and 2. FIG. 3 illustrates a flow chart for a method of determining a quantity of a first fuel and a quantity of a second fuel in a fuel tank. FIG. 4 is an example timeline representing supplying gaseous fuel and/or liquid fuel from the fuel system to the engine during various engine operating conditions.

Turning now to FIG. 1, it depicts an example embodiment of a combustion chamber or cylinder of internal combustion engine 10. Engine 10 may be controlled at least partially by a control system 13, including controller 12 and by input from a vehicle operator 130 via an input device 132. In one example, input device 132 includes an accelerator pedal and a pedal position sensor 134 for generating a proportional pedal position signal PP. Cylinder (e.g., combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may aid in mixing and combustion when operating the engine with an alcohol-based fuel due to the lower volatility of some alcohol-based fuels. Alternatively, the injector may be located overhead and near the intake valve to aid in mixing of intake air and injected fuel. Fuel may be delivered to fuel injector 166 from fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, although not shown in FIG. 1, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the air intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used. Furthermore the injection ratios may be adjusted based on one or more engine operating conditions such as engine load, engine speed, fuel system pressure, engine temperature, and the like. In this way one or both of liquid and gaseous fuels may be combusted in an engine cylinder.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved. Further still, fuel injectors 166 and 170 may each include one or more gaseous fuel injectors for injecting gaseous fuel, and one or more liquid fuel injectors for injecting liquid fuel.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank that holds a liquid fuel, such as gasoline, and also holds a gaseous fuel, such as CNG. Fuel injectors 166 and 170 may be configured to inject fuel from the same fuel tank, from different fuel tanks, from a plurality of the same fuel tanks, or from an overlapping set of fuel tanks. While FIG. 1 depicts fuel injector 166 as a direct fuel injector and fuel injector 170 as a port fuel injector, in other embodiments both injectors 166 and 170 may be configured as port fuel injectors or may both be configured as direct fuel injectors.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines that may be performed by the controller are described herein and with regards to FIGS. 3 and 4.

Turning now to FIG. 2, it shows a schematic diagram of a multi-cylinder engine in accordance with the present disclosure. As depicted in FIG. 1, internal combustion engine 10 includes cylinders 14 coupled to intake passage 144 and exhaust passage 148. Intake passage 144 may include throttle 162. Exhaust passage 148 may include emissions control device 178. Control system 13, including controller 12, may receive signals from various sensors 16, and additional sensors shown in FIGS. 1 and 2, and output signals to various actuators 81, including additional actuators shown in FIGS. 1 and 2.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166A and 166B, and fuel injectors 170A and 170B. Although only one cylinder is shown coupled to fuel injectors, it is to be understood that all cylinders 14 included in cylinder head 201 may also be coupled to one or more fuel injectors. In this example embodiment, fuel injectors 166A and 166B are depicted as a direct fuel injector and fuel injectors 170A and 170B are depicted as a port fuel injector. Although only two direct injectors and two port injectors are shown in FIG. 2, it is to be understood that engine 10 may comprise more than two direct injectors and more than two fuel injectors. Each fuel injector may be configured to deliver a specific quantity of gaseous and/or liquid fuel at a specific time point in the engine cycle in response to commands from controller 12. One or more fuel injectors may be utilized to deliver combustible fuel to cylinder 14 during each combustion cycle. The timing and quantity of fuel injection may be controlled as a function of engine operating conditions.

Fuel system 172 includes fuel tank 200. Fuel tank 200 may include a liquid fuel, such as gasoline, diesel fuel, or a gasoline-alcohol blend (e.g. E10, E85, M15, or M85), and may also include a gaseous fuel, such as CNG. Fuel tank 200 may be configured to store liquid fuel and gaseous fuel together at a relatively low pressure compared to conventional CNG storage (e.g. 200-250 atmospheres). For example, the gaseous fuel may be added to a pressure of 100 atmospheres. In this way, a portion of the gaseous fuel may be dissolved in the liquid fuel. At 100 atmospheres, CNG may dissolve in gasoline to the point where 40% of the liquid fuel component in fuel tank 200 is CNG. Fuel tank 200 may include pressure sensor 211, temperature sensor 212, and liquid level sensor 215. In one example, liquid level sensor may comprise a float sensor. Furthermore, the liquid fuel volume in the fuel tank may be determined from the measured liquid level.

Further still, when a mixed fuel, such as a liquid fuel and a gaseous fuel are stored in a fuel tank, the total liquid fuel volume may comprise the original liquid fuel plus a portion of the gaseous fuel solubilized in the liquid fuel. For example, a fuel tank comprising both diesel fuel and natural gas may include natural gas solubilized in the liquid diesel fuel. As another example, a fuel tank may comprise natural gas and gasoline, including natural gas solubilized in the gasoline. The amount of solubilized gaseous fuel in the liquid fuel may be determined from the solubility of the gaseous fuel in the liquid fuel. Furthermore, the quantity of gaseous fuel and the quantity of liquid fuel in the fuel tank may be determined based on the solubility of the gaseous fuel in the liquid fuel.

Known methods of determining solubility of gases in liquids may be used. For example, solubility parameters based on the gaseous fuel components and liquid fuel components may be determined as a function of fuel tank temperature and fuel tank pressure, and the solubility parameters may be used to calculate an estimation of the quantity of gaseous fuel solubilized in the liquid fuel. In another example, solubilities of various gaseous fuels in various liquid fuels may be determined empirically as a function of temperature, pressure, and fuel composition, and this solubility data may be stored in an easily referenced format such as solubility tables and by plotting solubility curves. Because gasoline and other fuels may comprise a complex mixture of many chemical components, it may be more difficult to accurately determine solubility parameters, and empirically measuring solubilities of a first fuel in a second fuel may be a more practical way of determining solubilities.

Liquid fuel and/or gaseous fuel may be supplied from fuel tank 200 to cylinders 14 of engine 10 via liquid fuel line 220 and gaseous fuel line and 221, fuel rails 205 and 206 and fuel injectors 166A, 166B, 170A, and 170B. In one example, gaseous fuel may be delivered from fuel tank 200 to gaseous fuel line 221 and gaseous fuel rail 205. Gaseous fuel delivered to gaseous fuel rail 205 may be port fuel injected to cylinder 14 by gaseous fuel injector 170B, and may be directly injected to cylinder 14 by liquid fuel injector 170A. Liquid fuel, including solubilized gaseous fuel in the liquid fuel, may be supplied from fuel tank 200 by operating fuel lift pump 210. Liquid fuel line 220 may be coupled to a lower portion of fuel tank 200 in order draw liquid fuel from fuel tank 200 via fuel lift pump 210. In some cases, fuel lift pump 210 may be omitted from fuel system 172. In such embodiments, the pressure of gaseous fuel stored in fuel tank 200 may be used to drive liquid fuel from fuel tank 200 to fuel rail 205 via fuel line 220. In embodiments where fuel lift pump 210 is omitted, an additional liquid fuel valve may be coupled to fuel line 220 to control liquid fuel flow through fuel line 220. Liquid fuel may be delivered to liquid fuel line 220 and liquid fuel rail 206, where liquid fuel may be directly injected into cylinder 14 via liquid fuel injector 166A and/or port fuel injected into cylinder 14 liquid fuel injector 166B.

In one example, gaseous fuel rail 205 may comprise a DI gaseous fuel rail for direct injecting gaseous fuel via one or more DI gaseous fuel injectors 170A and a PFI gaseous fuel rail for port injection of gaseous fuel via one or more PFI liquid fuel injectors 170B. Furthermore, liquid fuel rail 206 may comprise a DI liquid fuel rail for direct injecting liquid fuel via one or more DI liquid fuel injectors 166A and a PFI liquid fuel rail for port injection of liquid fuel via one or more PFI liquid fuel injectors 166B. Further still, a DI gaseous fuel pump may be provided upstream of DI gaseous fuel rail for delivering pressurized gaseous fuel to DI gaseous fuel rail. Further still, a DI liquid fuel pump may be provided upstream of DI liquid fuel rail for delivering pressurized liquid fuel to DI liquid fuel rail. Further still, a single DI fuel pump may be used to deliver both gaseous fuel and liquid fuel. Although not shown in FIG. 2, DI liquid fuel pump may be a high pressure fuel pump comprising a solenoid activated inlet check valve, a piston, and an outlet check valve for delivering high pressure liquid fuel to DI liquid fuel rail. Injection of liquid fuel via DI liquid fuel injection pump may lubricate the piston of liquid DI fuel pump, thereby reducing pump wear and degradation and reducing pump NVH.

In this way, solubilized gaseous fuel in the liquid fuel may be injected as liquid fuel into cylinder 14. Furthermore, gaseous fuel may be injected separately from liquid fuel to cylinder 14 via gaseous fuel injectors 170A and 170B. In other words, gaseous fuel may be injected only via gaseous fuel injectors and liquid fuel may be injected only via liquid fuel injectors. Furthermore, only gaseous fuel may be injected by switching off liquid fuel injection, or only liquid fuel may be injected by switching off gaseous fuel injection. Gaseous fuel may comprise compressed natural gas (CNG) and methane as non-limiting examples, while liquid fuel may comprise gasoline and diesel as non-limiting examples.

For example, injection of gaseous fuel may be increased because gaseous fuel may be lower cost, lower carbon intensity (e.g., lower $CO_2$ generating), higher octane, and the like, relative to liquid fuel. However, at high engine loads (especially when port fuel injecting gaseous fuel), injection of only gaseous fuel without injection of liquid fuel may reduce engine operability because the gaseous fuel may displace air (e.g., intake air entering the cylinder and/or at the intake air passage). Thus, at engine loads greater than a threshold load, injection of solubilized gaseous fuel in liquid fuel may be performed. Furthermore, at engine loads greater than a threshold load and when port fuel injection is ON, injection of solubilized gaseous fuel in liquid fuel may be performed.

As another example, injection of liquid fuel may provide increased cooling and lubrication of the DI injectors and/or DI fuel pump, relative to gaseous fuel injection. As such, injection of solubilized gaseous fuel in liquid fuel may be performed when increased cooling and lubrication of the DI injectors and/or DI fuel pump.

Fuel system 172 is shown coupled to refueling system 250. Refueling system 250 may be coupled to fuel tank 200 via tank access valve 218. Tank access valve 218 may be coupled to refueling conduit 260. Refueling conduit 260 may include high pressure refueling port 255. High pressure refueling port 255 may be configured to receive a pressurized gaseous fuel pump nozzle, or a fuel pump nozzle configured to deliver a pre-pressured mixture of liquid fuel and gaseous fuel. In some cases, a second high pressure refueling port may be included to allow compatibility with more than one type of high pressure fuel pump nozzle.

Access to high pressure refueling port 255 may be regulated by refueling lock 257. In some embodiments, refueling lock 257 may be a fuel cap locking mechanism. The fuel cap locking mechanism may be configured to automatically lock a fuel cap in a closed position so that the fuel cap cannot be opened. For example, the fuel cap may remain locked via refueling lock 257 while pressure in the fuel tank is greater than a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 257 may be a filler pipe valve located at a mouth of refueling conduit 260. In such embodiments, refueling lock 257 may prevent the insertion of a refueling pump into refueling conduit 260. The filler pipe valve may be electrically locked, for example by a solenoid, or mechanically locked, for example by a pressure diaphragm.

In some embodiments, refueling lock 257 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 257 is locked using an electrical mechanism, refueling lock 257 may be unlocked by commands from controller 12. In embodiments where refueling lock 257 is locked using a mechanical mechanism, refueling lock 257 may be unlocked via a pressure gradient.

Refueling conduit 260 may be coupled to low pressure refueling conduit 280. Low pressure refueling conduit 280 may be coupled to surge tank 270. Surge tank 270 may include a low pressure refueling port 265 and a liquid sensor 275. Low pressure refueling conduit 280 may include fuel pump 285 and check valve 290. Fuel pump 285 may only operate when fuel tank pressure is below a threshold, and may only operate when there is liquid fuel in surge tank 270, as sensed by liquid sensor 275. In this way, fuel pump 285 may not pump an air/fuel mixture into fuel tank 200. Further, when fuel tank pressure reaches a threshold, fuel pump 285 may be shut off by controller 12, causing liquid fuel to accumulate in surge tank 270. This may cause a low pressure liquid fuel dispenser nozzle engaged with low pressure refueling port 265 to turn itself off. Access to refueling port 265 may be regulated by refueling lock 267. Refueling lock 267 may comprise one of the examples described for refueling lock 257. Refueling locks 257 and 267 may further comprise different mechanisms.

In this manner a fuel system may comprise a fuel tank on board a vehicle, the fuel tank comprising a liquid fuel and a gaseous fuel stored therein, a liquid fuel level sensor and a temperature sensor and a pressure sensor positioned at the fuel tank, and a controller, with executable instructions to, during a first condition, measure a volume of the liquid fuel in the fuel tank with the liquid fuel level sensor, wherein the liquid fuel comprises a first fuel and a second fuel, measure a pressure of the fuel tank with the pressure sensor, based on the volume of the liquid fuel, calculate a volume of the gaseous fuel in the fuel tank, wherein the gaseous fuel comprises essentially the second fuel, determine a solubility of the second fuel in the first fuel based on the temperature and pressure, and based on the solubility of the second fuel in the first fuel, determining a quantity of the first fuel and a quantity of the second fuel in the fuel tank. The first condition may comprise when a fuel tank temperature change is greater than a threshold fuel tank temperature change. The first condition may comprise when a fuel tank pressure change is greater than a threshold fuel tank pressure change. Furthermore, the first fuel may comprise gasoline and the second fuel may comprise natural gas.

Turning now to FIG. 3, it illustrates an example flow chart for a method 300 of operating an engine system and a fuel system. Method 300 may be executed by control strategy of controller 12 of control system 13. Furthermore, although method 300 is herein described for the case of a single fuel tank, method 300 may also be applied to the case of more than one fuel tank, wherein quantities of a first fuel and a second fuel are determined in multiple fuel tanks. Further still, the fuel types in each fuel tank may be different.

Method 300 begins at 310 where engine operating conditions such as engine on condition (EOC), engine temperature, fuel system pressure, engine torque, engine load, engine speed (RPM) and the like are measured and/or estimated. Method 300 continues at 320 where various fuel system conditions may be estimated and/or measured such as fuel tank temperature, fuel tank pressure, fuel tank liquid level, and the like. Furthermore, controller 12 may utilize these measured and/or estimated quantities to calculate related parameters such as fuel tank liquid volume, volume of fuel injected to the engine, engine on time, a change in fuel tank pressure, a change in fuel tank temperature, and the like.

Method 300 continues at 330 where it determines if a condition to quantify the fuel solubility in the fuel tank is satisfied. The condition to quantify the fuel solubility in the fuel tank may be satisfied by one or more engine and/or fuel system conditions. For example, if the fuel tank has just been refilled, the condition to quantify the fuel solubility in the fuel tank may be satisfied because the composition of fuels in the fuel tank may have changed. Refilling the fuel tank may comprise determining that a liquid level in the fuel tank has increased from a previously measured liquid level by more than a threshold amount, or that a pressure in the fuel tank has increased from a previously measured pressure by a threshold amount. As another example, if the engine has just been switched ON, the condition to quantify the fuel solubility in the fuel tank may be satisfied because the operator may then be notified as to the quantity of fuels remaining in the fuel tank each time the engine is switched ON. Knowing the quantity of fuels remaining in the fuel tank may aid the operator in deciding if refilling the tank is needed during an upcoming vehicle trip.

Furthermore, if an elapsed time since the previous instance fuel in the fuel tank was quantified may be greater than a threshold time, the condition to quantify the fuel solubility in the fuel tank may be satisfied because a substantial amount of fuel may have been consumed during the elapsed time so that the quantity of fuels in the fuel tank may be updated. If a change in fuel tank pressure is greater than a threshold pressure change, or a change in fuel tank temperature is greater than a threshold temperature change, the condition to quantify the fuel solubility in the fuel tank may be satisfied because an amount of a first fuel and/or an amount of a second fuel in the fuel tank may have been consumed or added during a refill. For example, during a refill of the tank with natural gas, a fuel tank pressure may increase. Furthermore, a fuel tank temperature may increase due to the tank pressurization during a refill. Further still, a fuel tank temperature may increase as an engine warms up or as an ambient temperature increases, thereby reducing the solubility of gaseous fuel in the liquid fuel, and decreasing a liquid fuel volume, and increasing a fuel tank pressure.

If a volume of fuel injected into the engine is greater than a threshold volume following quantifying the fuels in the fuel tank, the condition to quantify the fuel solubility in the fuel tank may be satisfied because the quantify of the first fuel and the second fuel in the fuel tank may have substantially decreased. Furthermore, if the volume of liquid in the fuel tank is less than a threshold volume, the condition to quantify the fuel solubility in the fuel tank may be satisfied because a risk of depleting the fuel in the fuel tank may be increased, which may reduce vehicle drivability and operability.

If at 330 the condition to quantify fuel solubility in the fuel tank is not satisfied, method 300 continues at 334 where the operator is provided an indication of the quantities of the first fuel and the second fuel in the fuel tank without recalculating a solubility of $fuel_2$ in $fuel_1$. Because a condition to quantify fuel solubility is not satisfied at 330, the change in the volume of $fuel_2$ solubilized in $fuel_1$ since the previous solubility measurement of $fuel_2$ in $fuel_1$ may be very small, as compared to when the condition to quantify fuel solubility is satisfied at 330. As such, an operator indication of the quantities of $fuel_1$ and $fuel_2$ in the fuel tank may be based on the previous solubility measurement (e.g. the previous instance when the condition to quantify fuel was satisfied), a fuel tank pressure, and a liquid fuel volume (e.g., based on a fuel liquid level sensor).

After 334, method 300 continues at 338 where engine operation is adjusted based on the quantity of $fuel_1$ and the quantity of $fuel_2$. At 338 the quantities of $fuel_1$ and $fuel_2$ are based only on the previous solubility of $fuel_2$ in $fuel_1$ when a condition to quantify fuel solubility was last satisfied. Because the condition to quantify fuel solubility is not satisfied, the previous solubility may be an accurate indication of the current fuel solubility since the engine is already ON, the change in fuel tank temperature and pressure since the last time a condition to quantify fuel solubility was satisfied is less than a threshold change, the volume of fuel injected since the last time a condition to quantify fuel solubility was satisfied is less than a threshold volume, the elapsed time since the last time a condition to quantify fuel solubility was satisfied is less than a threshold time, the volume of liquid in the fuel tank is greater than a threshold volume, and the like.

Returning to 330, if the condition to quantify fuel solubility in the fuel tank is satisfied, method 300 continues at 340 where it calculates the volume of gaseous fuel in the fuel tank based on the measured liquid level. In one example a volume of liquid fuel in the fuel tank may be calculated based on the measured liquid level. A volume of gaseous fuel in the fuel tank may then be calculated by subtracting the volume of liquid fuel in the fuel tank from the total fuel tank volume. The volume of gaseous fuel may comprise a mixture of the first fuel vapor and the second fuel, for example, gasoline vapor and natural gas, respectively. However, the concentration of gasoline vapor may be relatively very low as compared to the concentration of natural gas in the gas phase such that the gaseous fuel may consist essentially of the gaseous natural gas. Accordingly, a volume of gaseous fuel may correspond to a volume of a second fuel in the gas phase in the fuel tank. Thus, a quantity of the second fuel in the gas phase may be determined from the volume of gaseous fuel.

Next, method 300 continues at 350 where it determines the solubility of a second fuel in the first fuel. In the case of a mixed fuel (e.g., more than one type of fuel and/or more than one type of fuel phase), the liquid volume may comprise a volume of a first fuel and a volume of a second fuel solubilized in the first fuel. Solubility of gaseous fuels such as methane and natural gas in liquid fuels such as gasoline or diesel varies with temperature, pressure, and fuel composition. For example, as temperature increases and/or as pressure decreases, solubility of a gaseous fuel in a liquid fuel may decrease. Conversely, as temperature decreases and/or pressure increases, solubility of a gaseous fuel in a liquid fuel may increase. Solubility properties of gaseous fuels in liquid fuels may be predetermined and/or measured offline over a broad range of temperatures and pressures, and for a wide range of fuel types and/or combinations. For example, a liquid fuel may comprise gasoline of various grades (e.g., ethanol content, octane rating, butane content, and the like) or diesel (e.g., regular diesel, biodiesel, and the like), and the like. Furthermore, a gaseous fuel may comprise natural gas, methane, propane, butane, and the like. For example, a first fuel may comprise one or more liquid fuels such as gasoline and/or diesel, and a second fuel may comprise a gaseous fuel such as natural gas, or methane. By tabulating the measured predetermined solubilities of gaseous fuels in liquid fuels and storing the solubility tables as a function of temperature and pressure in an on board vehicle controller, a solubility of a gaseous fuel in a liquid fuel may be determined on board a vehicle, given a temperature and pressure of the fuel. For example, knowing a fuel tank temperature and a fuel tank pressure, the solubility of a second fuel in a first fuel in the fuel tank may be determined. The example plot at 350 of method 300 illustrates example solubility data for a second fuel in a first fuel over a range of pressures and temperatures. In a further example, solubility models known in the art or known methods of curve fitting may be applied to aid in interpolation and extrapolation of the predetermined solubility data. In this way, solubility of a second fuel in a first fuel may be estimated in a simple manner, without increasing manufacturing complexity and costs, such as for installation of complex fuel composition sensors.

Next, method 300 continues at 360, where based on the solubility of the second fuel in the first fuel, the quantity of a first fuel and the quantity of a second fuel in the fuel tank may be determined. For example, knowing the solubility of the second fuel in the first fuel, a concentration of the second fuel in the liquid fuel volume may be calculated. Furthermore, a quantity of the second fuel in the liquid fuel volume may be calculated based on the concentration of the second fuel in the liquid fuel. Accordingly a quantity of the first fuel may be calculated by subtracting the quantity of the second fuel in the liquid fuel from the liquid fuel volume. Furthermore a quantity of the second fuel may be determined by adding the quantity of the second fuel in the liquid fuel to the quantity of the second fuel calculated from the gaseous fuel volume determined at 340.

Next at 370, method 300 may provide the vehicle with an indication of the quantity of the first fuel and the quantity of the second fuel in the fuel tank. For example, method 300 may update fuel gauges and/or low fuel warning lights/chimes on an operator console to notify an operator of the quantities of each fuel type in one or more fuel tanks. In this manner, an operator may adjust a driving route based on the quantities of each fuel type. For example, if the quantities of one or more types of fuel are low, the operator may shorten a driving route, or may refill the fuel tank. Thus method 300 may increase vehicle operability and drivability since it may reduce a risk of depleting fuel in the fuel tank while driving. Furthermore, based on the quantity of each fuel type in the fuel tank, an operator may adjust a refueling strategy. For example, if the fuel tank pressure is low, or if a quantity of gaseous fuel is low, a fuel tank may be refilled at a low pressure refueling station instead of a high pressure refueling station, thereby reducing fuel costs, and increasing convenience to the vehicle operator.

Next at 380, method 300 may adjust engine operation based on a quantity of a first fuel and a quantity of a second fuel in the fuel tank. For example, a first fuel may have different knock behavior, fuel cost, and fuel economy than a second fuel. As an example, natural gas fuel may be lower cost than gasoline and engine operation may be adjusted to inject and combust primarily natural gas fuel when a quantity of natural gas in a fuel tank is higher. In another example during a cold start, engine operation may be adjusted to inject primarily natural gas in order to reduce hydrocarbon emissions. As another example, engine operation may be adjusted to inject primarily natural gas as compared to gasoline to reduce engine knock. Adjusting engine operation may further include adjusting a variable valve and/or cam timing, engine speed (e.g., including adjusting a transmission gear shifting strategy), air/fuel ratio, and the like to maintain or increase vehicle drivability.

In this way, by identifying the quantity of $fuel_1$ and $fuel_2$ in the fuel tank based on a solubility of a second fuel in the first fuel, the quantity of $fuel_1$ and $fuel_2$ may be more accurately determined as compared to the case when the quantities of $fuel_1$ and $fuel_2$ in the fuel tank are not based on a solubility of a second fuel in the first fuel.

Although in the example method 300, two fuels are described, method 300 may also be applied to more than two fuel types. For example, a first fuel tank may contain gasoline and natural gas, and a second fuel tank may contain higher octane gasoline and natural gas. As another example, a second fuel tank may contain gasoline and propane. Other example fuel combinations may also be provided, as described above.

In this manner, method may comprise on board a vehicle, identifying a volume of gaseous fuel in a tank based on a volume of liquid fuel in the tank, the liquid fuel comprising a first fuel and a second fuel, the gaseous fuel comprising essentially the second fuel, and identifying quantities of the first fuel and the second fuel in the tank based on a solubility of the second fuel in the first fuel. The method may further comprise, adjusting a first fuel level indicator based on the quantity of the first fuel in the fuel tank and adjusting a second fuel level indicator based on the quantity of the second fuel in the fuel tank. Measuring the volume of the liquid fuel may comprise measuring a volume of the first fuel and a volume of the second fuel solubilized in the first fuel. The method may further comprise measuring a fuel tank temperature and measuring a fuel tank pressure. Furthermore, determining the solubility of the second fuel in the first fuel may comprise referencing predetermined solubility data of the second fuel in the first fuel based on the fuel tank temperature and a fuel tank pressure. Further still, the first fuel may comprise one or more of gasoline, alcohol, and diesel fuel. Further still, the second fuel may comprise one or more of methane, propane, butane, and natural gas.

The method may further comprise adjusting operation of an engine based on the quantity of the first fuel and the quantity of the second fuel stored in the fuel tank. The method may further comprise adjusting a refueling operation for a fuel system based on the quantity of the first fuel and the quantity of the second fuel stored in the fuel tank. Furthermore, the gaseous fuel may consist essentially of the second fuel.

In this manner, an engine operation method may comprise determining a solubility of a second fuel in a first fuel, determining quantities of the first fuel and the second fuel in a fuel tank based on the solubility, and adjusting first and second fuel indicators based on the quantities of the first fuel and the second fuel in the fuel tank. Determining the quantity of the first fuel and the quantity of the second fuel in the fuel tank may comprise measuring a volume of a liquid fuel in a fuel tank, wherein the liquid fuel comprises the first fuel and the second fuel solubilized in the first fuel, and based on the volume of the liquid fuel, calculating a volume of a gaseous fuel in the fuel tank, wherein the gaseous fuel comprises essentially the second fuel. The first condition may comprise when a fuel tank temperature change is greater than a threshold fuel tank temperature change. Furthermore, the first condition may comprise when a fuel tank pressure change is greater than a threshold fuel tank pressure change. Further still, the first condition may comprise when a fuel tank is refilled. Further still, the first condition may comprise after an engine is switched on.

Turning now to FIG. 4, it illustrates an example timeline 400 for operating an engine system and a fuel system, comprising a gaseous fuel and a liquid fuel. Timeline 400 includes timelines for a condition for quantifying fuels 410, an engine status 420, a fuel tank temperature difference 430 since fuel was last quantified by method 300, a quantity of a first fuel 440, $fuel_1$, in the fuel tank, a quantity of a second fuel 450, $fuel_2$, in the fuel tank, fuel injection of $fuel_1$ 460, and fuel injection of $fuel_2$ 470. Also illustrated are a threshold temperature difference 434, a threshold quantity of $fuel_1$ 444, and a threshold quantity of $fuel_2$ 454. In the example shown in timeline 400, $fuel_1$ may represent a liquid fuel such as gasoline, and $fuel_2$ may represent a gaseous fuel such as natural gas.

At time t1, an engine status is switched from OFF to ON and thus a condition for quantifying fuels is satisfied as shown by 410. Because the engine is switched ON, the engine begins to warm, and the fuel tank temperature begins to increase, thereby increasing ΔT 430 after time t1. Furthermore, a quantity of $fuel_1$ 440 and a quantity of $fuel_2$ 450 may be determined based on a measured liquid fuel volume, a calculated gas fuel volume, and a solubility of $fuel_2$ in $fuel_1$ in the liquid fuel volume according to a fuel tank temperature and a fuel tank pressure, as described above via method 300.

As shown in timeline 400, the quantity of both $fuel_1$ and $fuel_2$ are high, being greater than a threshold quantity of $fuel_1$ 444 and a threshold quantity of $fuel_2$ 454, respectively. As such, the engine operation may be adjusted to primarily inject $fuel_2$ (e.g., natural gas) during the cold startup to reduce engine emissions. Furthermore, because the cost of natural gas may be less than the cost of gasoline, the controller may continue to operate the engine by injecting primarily natural gas relative to gasoline in order to reduce fuel costs. Shortly after time t1, the condition for quantifying fuels resets to NO since the quantity of $fuel_1$ and the quantity of $fuel_2$ have been determined.

Next, at time t2, the temperature difference, ΔT 430, since the previous quantifying of fuels in the fuel tank, increases above a threshold ΔT 434. As such a condition for quantifying fuels is satisfied. As described above, a quantity of $fuel_1$ 440 and a quantity of $fuel_2$ 450 may be determined based on a measured liquid fuel volume, a calculated gas fuel volume, and a solubility of $fuel_2$ in $fuel_1$ in the liquid fuel volume according to a fuel tank temperature and a fuel tank pressure, according to method 300. At time t2, the quantity of $fuel_2$ 450 (e.g., natural gas) has decreased below a threshold quantity of $fuel_2$ 454, while the quantity of $fuel_1$ (e.g., gasoline) remains above a threshold quantity of $fuel_1$ 444. In response, controller 12 may adjust an engine operation to reduce injection of $fuel_2$ 470 and increase injection of $fuel_1$ 460 in the engine. Furthermore, controller 12 may provide an indication of the quantity of $fuel_1$ and the quantity of $fuel_2$ to the operator, for example via fuel tank fuel gauges. In response, the operator may adjust a fuel refilling strategy and/or a driving route. For example, upon being provided with an indication of a low quantity of $fuel_2$, the vehicle operator may shorten a planned driving route in order to refill the fuel tank. Furthermore, since the quantity of fuel$_2$ is low, the pressure in the fuel tank may be low so that a low pressure refilling station may be used, thereby reducing refueling costs.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   on board a vehicle and executed by a vehicle controller,
   determining a liquid volume based on a fuel level sensor;
   determining a gas volume based on the liquid volume, the liquid volume comprising first and second fuels, the gas volume comprising the second fuel;
   determining a second fuel solubility in the first fuel based on a fuel temperature sensor;
   determining first and second fuel quantities based on the second fuel solubility; and
   adjusting engine operation based on the first and second fuel quantities.

2. The method of claim 1, further comprising, adjusting a first fuel level indicator based on the first fuel quantity, and adjusting a second fuel level indicator based on the second fuel quantity.

3. The method of claim 1, further comprising determining the second fuel solubility based on a fuel pressure sensor.

4. The method of claim 3, wherein determining the solubility of the second fuel in the first fuel comprises referencing predetermined solubility data of the second fuel in the first fuel based on the fuel temperature sensor and the fuel pressure sensor.

5. The method of claim 1, wherein the first fuel comprises one or more of gasoline, alcohol, and diesel fuel.

6. The method of claim 1, wherein the second fuel comprises one or more of methane, propane, butane, and natural gas.

7. The method of claim 1, further comprising adjusting a refueling operation for a fuel system based on the first and second fuel quantities.

8. The method of claim 1, wherein the gas volume consists essentially of the second fuel.

9. A method for an engine having a controller, comprising providing the controller with instructions executable to:
   during a first condition,
   determining a second fuel solubility in a first fuel based on a fuel temperature sensor and a fuel pressure sensor,
   determining first and second fuel quantities in a fuel tank based on the second fuel solubility, and
   adjusting first and second fuel indicators based on the first and second fuel quantities.

10. The method of claim 9, wherein determining the first and second fuel quantities comprises,
    measuring a volume of a liquid fuel in a fuel tank, wherein the liquid fuel comprises the first fuel and the second fuel solubilized in the first fuel, and
    based on the volume of the liquid fuel, calculating a volume of a gaseous fuel in the fuel tank, wherein the gaseous fuel consists essentially of the second fuel.

11. The method of claim 9, wherein the first condition comprises when a fuel tank temperature change is greater than a threshold fuel tank temperature change.

12. The method of claim 9, wherein the first condition comprises when a fuel tank pressure change is greater than a threshold fuel tank pressure change.

13. The method of claim 9, wherein the first condition comprises when the fuel tank is refilled.

14. The method of claim 9, wherein the first condition comprises after the engine is switched on.

15. A fuel system, comprising:
    a fuel tank on board a vehicle, the fuel tank comprising a liquid fuel and a gaseous fuel stored therein;
    a liquid fuel level sensor and a temperature sensor and a pressure sensor positioned at the fuel tank; and
    a controller, with executable instructions to,
    during a first condition,
    measure a volume of the liquid fuel in the fuel tank with the liquid fuel level sensor, wherein the liquid fuel comprises a first fuel and a second fuel;
    measure a pressure of the fuel tank with the pressure sensor;
    measure a temperature of the fuel tank with the temperature sensor;
    based on the volume of the liquid fuel, calculate a volume of the gaseous fuel in the fuel tank, wherein the gaseous fuel comprises essentially the second fuel;
    determine a solubility of the second fuel in the first fuel based on the pressure and the temperature; and
    based on the solubility of the second fuel in the first fuel, determining a quantity of the first fuel and a quantity of the second fuel in the fuel tank.

16. The system of claim 15, wherein the first condition comprises when a fuel tank temperature change is greater than a threshold fuel tank temperature change.

17. The system of claim 15, wherein the first condition comprises when a fuel tank pressure change is greater than a threshold fuel tank pressure change.

18. The system of claim 15, wherein the first fuel comprises gasoline and the second fuel comprises natural gas.

19. The method of claim 1, wherein determining the liquid volume comprises determining the liquid volume in a fuel tank, and determining the gas volume comprises determining the gas volume in the fuel tank.

20. The method of claim 19, wherein determining the first and second fuel quantities comprises determining the first and second fuel quantities in the fuel tank.

* * * * *